(12) United States Patent
Milich et al.

(10) Patent No.: US 11,501,012 B1
(45) Date of Patent: Nov. 15, 2022

(54) METHOD AND SYSTEM FOR SECURE LINK SHARING

(71) Applicant: Skiff World, Inc., New York, NY (US)

(72) Inventors: Andrew Milich, New York, NY (US); Jason Ginsberg, New York, NY (US)

(73) Assignee: SKIFF WORLD, INC., New York, NY (US)

(*) Notice: Subject to any disclaimer, the term of this patent is extended or adjusted under 35 U.S.C. 154(b) by 106 days.

(21) Appl. No.: 17/218,921

(22) Filed: Mar. 31, 2021

(51) Int. Cl.
| | |
|---|---|
| G06F 21/62 | (2013.01) |
| G06F 21/78 | (2013.01) |
| G06F 21/60 | (2013.01) |
| H04L 67/06 | (2022.01) |
| H04L 67/141 | (2022.01) |
| H04L 67/143 | (2022.01) |
| H04L 67/1097 | (2022.01) |
| H04L 9/12 | (2006.01) |
| H04L 9/32 | (2006.01) |

(52) U.S. Cl.
CPC ........ *G06F 21/6218* (2013.01); *G06F 21/602* (2013.01); *G06F 21/78* (2013.01); *H04L 67/06* (2013.01); *H04L 67/1097* (2013.01); *H04L 67/141* (2013.01); *H04L 67/143* (2013.01); *G06F 2221/0753* (2013.01)

(58) Field of Classification Search
None
See application file for complete search history.

(56) References Cited

U.S. PATENT DOCUMENTS

| | | | |
|---|---|---|---|
| 2004/0151318 A1* | 8/2004 | Duncanson, Jr. | H04L 9/083 380/277 |
| 2009/0217035 A1* | 8/2009 | Abdul Hameed Khan | G06Q 20/3829 713/168 |
| 2014/0032922 A1* | 1/2014 | Spilman | G06F 21/602 713/184 |
| 2014/0089662 A1* | 3/2014 | Huang | G06F 21/602 707/622 |

OTHER PUBLICATIONS

Security and key management in IoT-based wireless sensor networks: An authentication protocol using symmetric key. Ghani. Wiley. (Year: 2019).*

(Continued)

*Primary Examiner* — Venkat Perungavoor
(74) *Attorney, Agent, or Firm* — Baker Botts L.L.P.

(57) ABSTRACT

Methods and systems for sharing a network link of a file in network storage for collaboration among multiple computing devices using end-to-end encryption may involve generating a link key associated with the file stored remotely in the network storage, being accessible by a first device, and to be accessible by a second device, encrypting a session key associated with the file to generate an encrypted session key using the link key, the file being encrypted with the session key and, generating a salt associated with the file, generating a verifier associated with the file using the link key, sending a message to a server computer with an identifier associated with the file, the salt, the verifier, and the encrypted session key, creating a first link to the file with a name associated with the first device, the identifier, and the link key, and transmitting the first link to second device.

30 Claims, 9 Drawing Sheets

(56) References Cited

OTHER PUBLICATIONS

UCloud: a user-centric key management scheme for cloud data protection. Kao. IETIS. (Year: 2013).*

OpenStack Secure Enterprise File Sync and Share Turnkey Solution. Kuo. IEEE. (Year: 2014).*

Analyzing and Searching Process of Internet Username and Password Stored in Random Access Memory (RAM). Thongjul. IEEE. (Year: 2015).*

"Secure Remote Password Protocol," Wikipedia, retrieved from: https://en.wikipedia.org/w/index.php?title=Secure_Remote_Password_protocol&oldid=1000739291, Jan. 16, 2021.

* cited by examiner

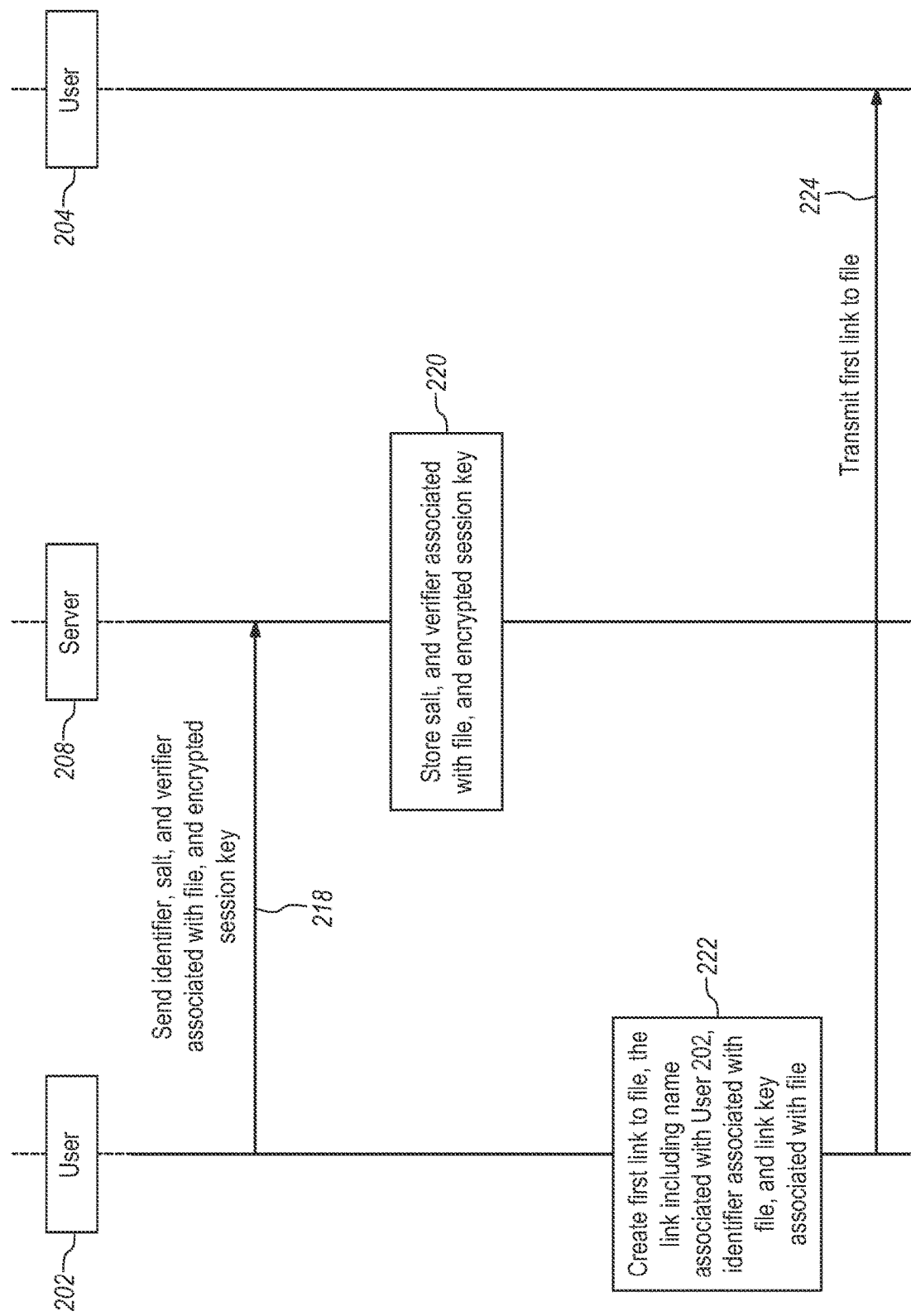
FIG. 2A Continuation

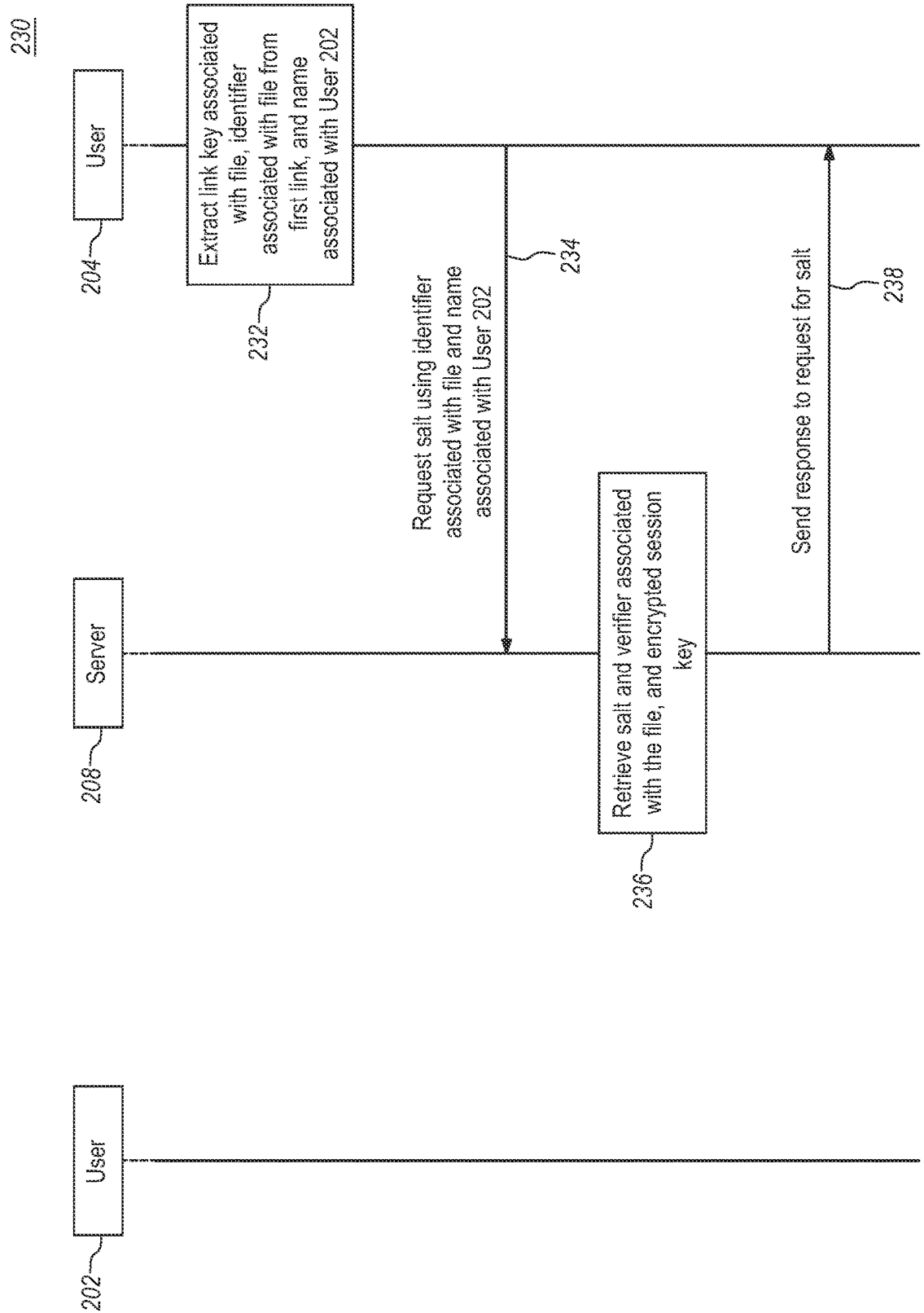

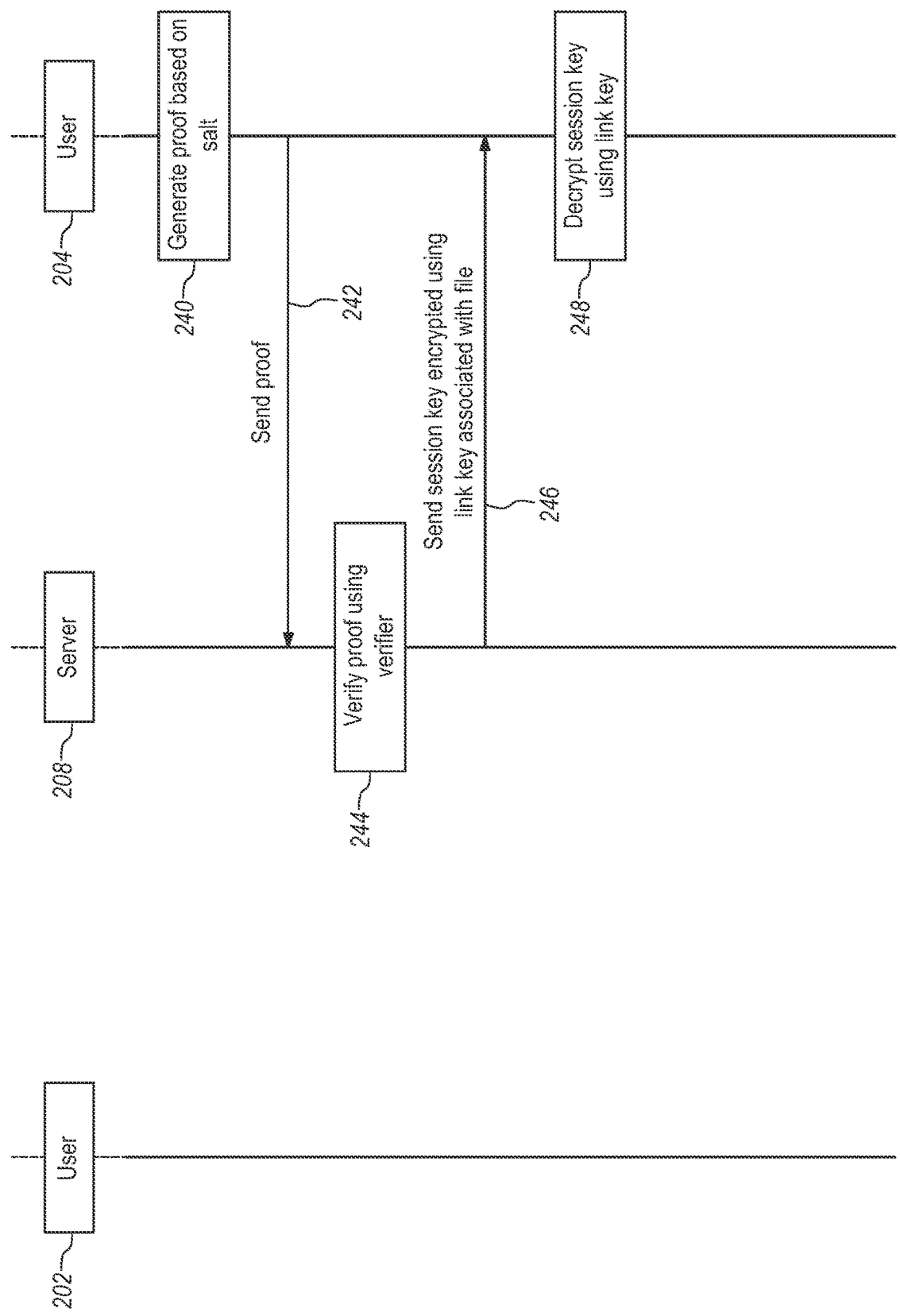
FIG. 2B Continuation

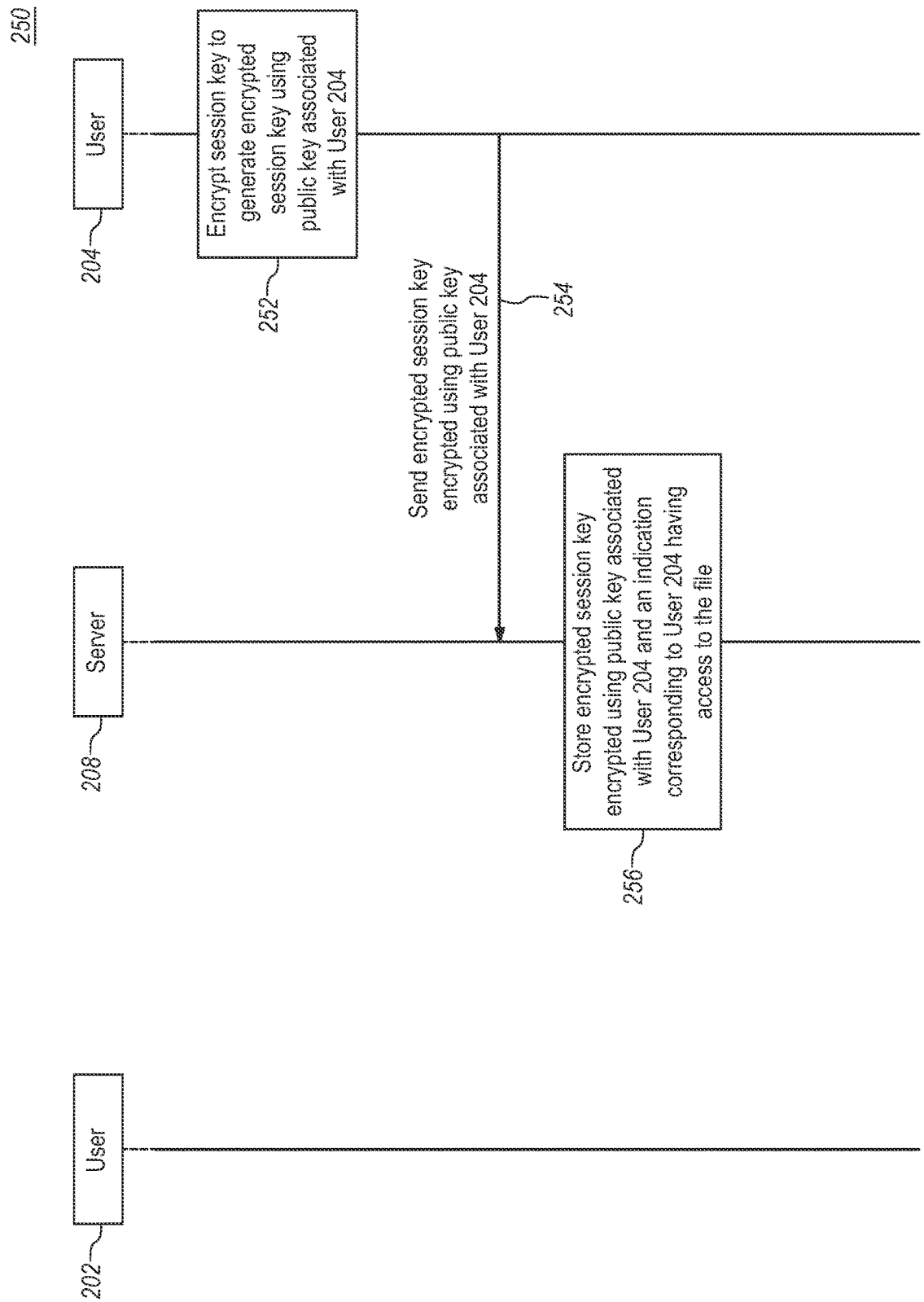

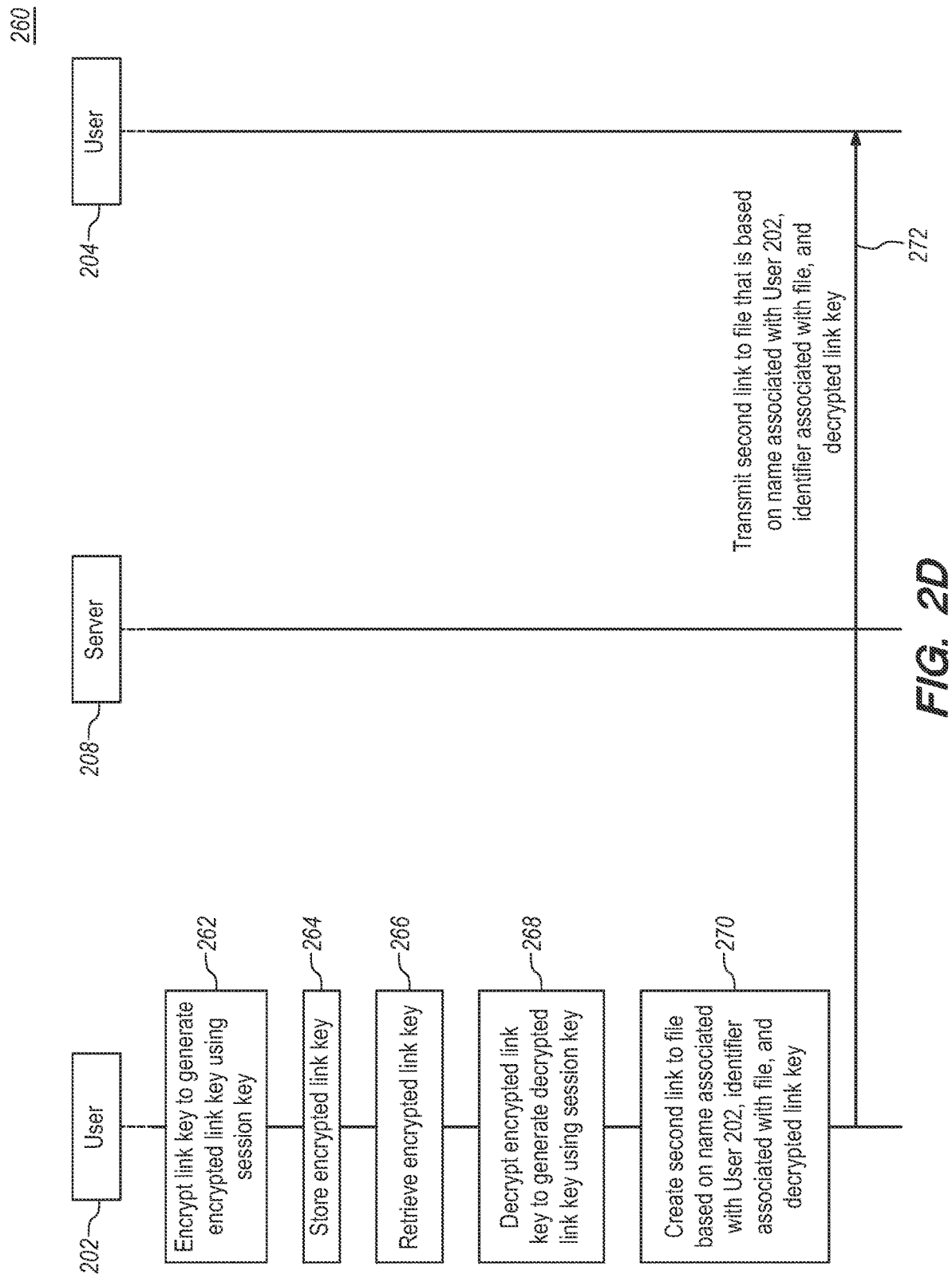

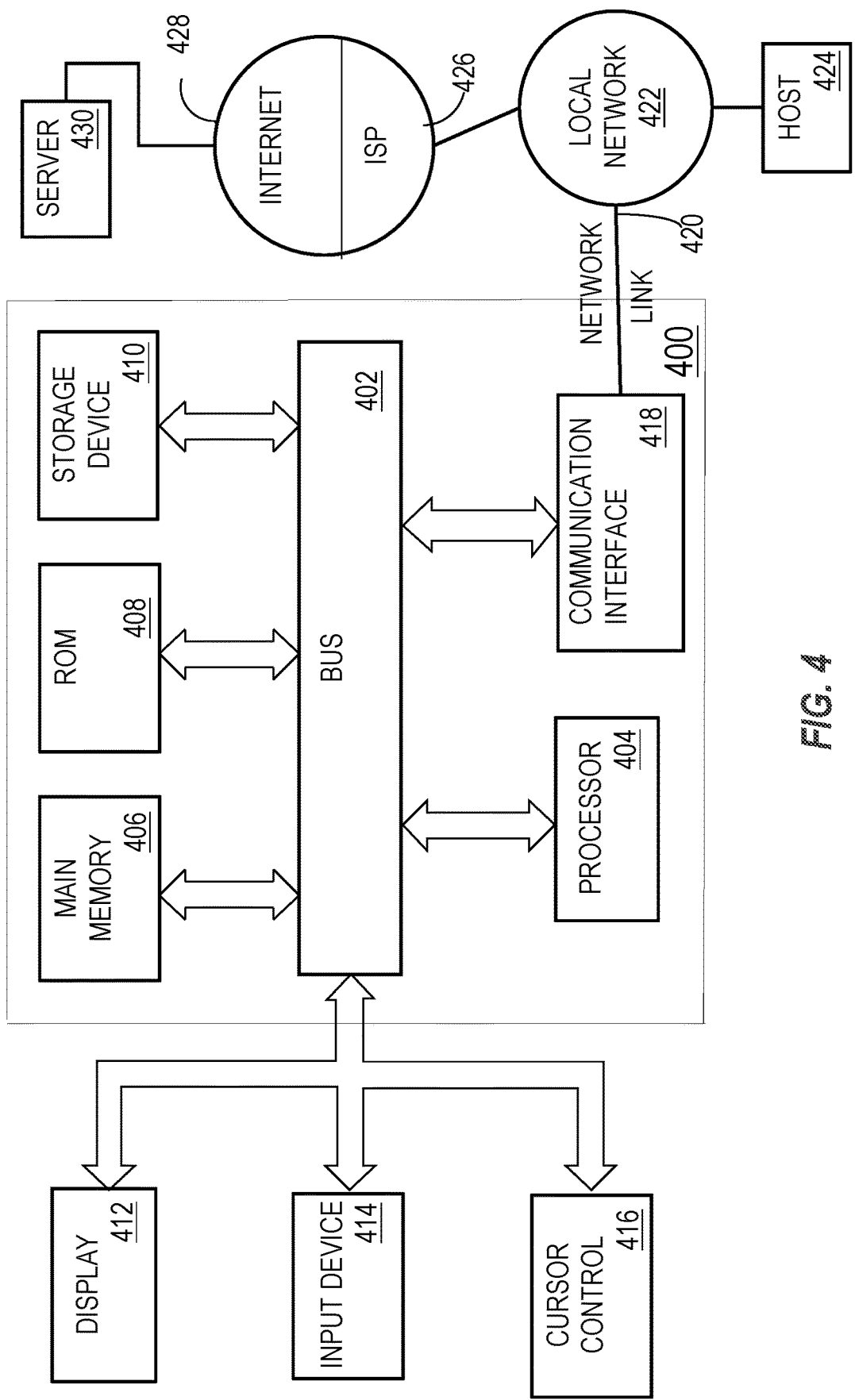

METHOD AND SYSTEM FOR SECURE LINK SHARING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2020-2021 Nightwatch, Inc.

TECHNICAL FIELD

One technical field of the present disclosure relates to secure document sharing using secure links. Another technical field is collaborative electronic document management using distributed computer systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As the value and use of information and documents that contain information continues to increase, individuals who provide or use information seek additional ways to store and access information and documents. One option available to individuals is to send information and documents from one individual to another over e-mail or a form of electric messaging. As the amount of information and the size of documents that contain information has increased, individuals increasingly use another available option to send a link to the information and documents for another individual to access. In addition, as the number of devices available to an individual have increased, individuals have exported storage of information to external devices accessible to multiple devices and individuals.

As storage and access to information and documents that contain information has expanded, securing the information has become increasingly difficult. While storage and access to information has expanded, there has been an increase in attacks to take advantage of vulnerabilities to gain unauthorized access to information. These attacks include using compromised usernames and passwords of accounts for e-mail, electronic messaging, and document storage platforms, intercepting the transmission of information from one device to another, retrieving externally stored information without proper credentials for access, or any combination of attacks. One solution to secure information is to transfer information using a secure protocol. However, secure transfer protocols may become compromised allowing malicious actors to intercept transmissions of and gain access to sensitive information and documents. Another solution to secure information is to prohibit export and sharing of information and documents. However, solutions restricting export and sharing also restrict use of the information and collaboration with documents containing information. Solutions to secure information and documents from malicious attacks, therefore, typically cannot rely solely on security protocols capable of being compromised by malicious actors seeking access to sensitive information and documents and cannot prohibit all sharing of information or collaboration between multiple devices and individuals.

SUMMARY

The appended claims may serve as a summary of the invention.

BRIEF DESCRIPTION OF THE DRAWINGS

In the drawings:

FIG. 2B illustrates an example process showing a message flow diagram for secure file access via a secure link.

FIG. 2C illustrates an example process showing a message flow diagram for secure link recreation and transmittal.

FIG. 2D illustrates an example process showing a message flow diagram for subsequent secure link creation and transmittal.

FIG. 4 illustrates a computer system with which one embodiment could be implemented.

DETAILED DESCRIPTION

Figure 1:
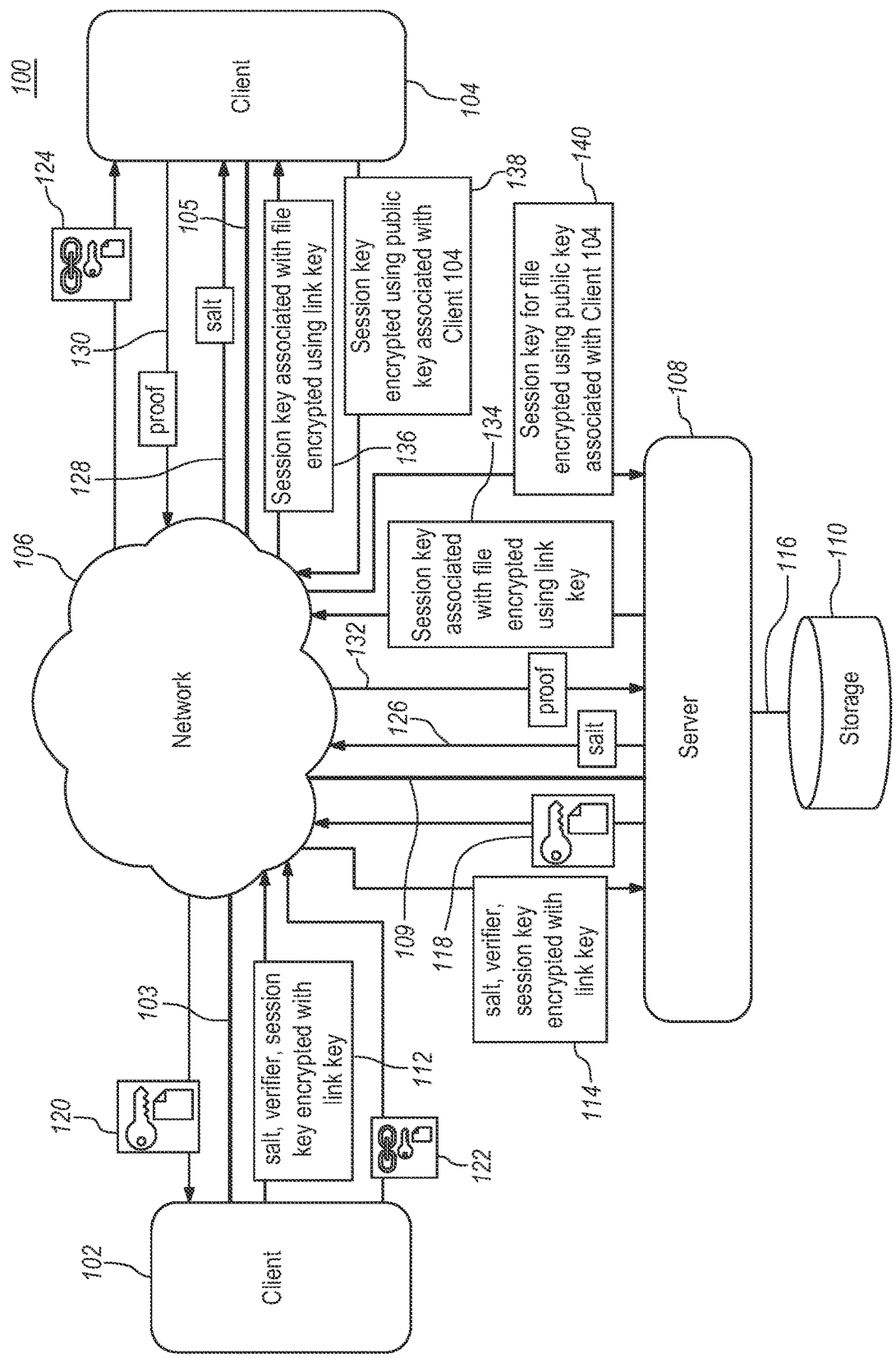
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
3. Implementation Example—Hardware Overview

1. General Overview

A system and method for sharing a network link to a digital file for secure collaboration among multiple computing device may be performed by a user device and/or server computer. Embodiments may be implemented using stored program instructions that computer devices execute to carry out the functions that are described. In an embodiment, a user device may have access to the digital file stored in network storage and may seek to collaborate securely with another user device. Those skilled in the art will appreciate that a user device refers, without limitation, to a computing device or account that is associated with a user having access to or logged in to the computing device. The user device may generate a link key that is associated with the digital file to be shared with the other user device. The link key may be generated using a random number and may be used for secure link sharing.

After the link key is generated, the user device may encrypt a session key that is associated with the digital file using the link key to generate an encrypted session key. In at least some embodiments, the value of the link key may be equal to the value of the session key. The user device may use the session key to encrypt and decrypt the digital file in network storage to enable the file to be encrypted during network storage or transmission between multiple user devices. The user device may also generate one or more values for a secure password authentication. For example, the user device may generate a salt and a verifier for secure remote password authentication that are associated with the digital file in which the link key may be used as a password to generate the verifier.

The user device may create a link to the digital file to be shared with the other user device. The link may include a name that is associated with the user device, such as a username, the identifier that is associated with the digital file, and the link key that is associated with the file. After the link is created, the user device may transmit the link to the other user device. Those skilled in the art will appreciate that the link may be transmitted directly or indirectly from the user device to the other user device. One or more portions of the link, such as the link key that is associated with the file, may be end-to-end encrypted between the user device and the other user device. In addition, the user device may create a message to be sent to a server computer. The message received by the server computer may include one or more portions of the link that are not end-to-end encrypted between the user device and the other user device, such as the name that is associated with the user device and the identifier that is associated with the digital file. The message may also include the encrypted session key and one or more generated values for a secure password authentication, such as the salt and the verifier. The message may be sent to a server computer that stores the encrypted session key and generated values, such as the salt and the verifier, in correspondence with the name that is associated with the user device and/or the identifier that is associated with the digital file.

The other user device may receive the link and extract from the link the name that is associated with the user device, the link key that is associated with the digital file, and identifier that is associated with the digital file. If the other user device is not logged in to the server computer, the other user device may initiate secure password login. After extracting the name, link key, and identifier from the link, the other user device may request, for example, a salt that is associated with the digital file from the server computer. The request may include the identifier that is associated with the digital file and the name that is associated with the user device. While certain embodiments focus on login using secure remote password techniques, other embodiments may use other login methods. Examples include using a hashed password, biometric login techniques, two-factor authentication, and token-based login.

The server computer may receive the request. If the identifier in the request corresponds to an identifier associated with a digital file in network storage and the name in the request corresponds to a user device with access to the digital file, the server computer may send a response to the other user device that includes the salt associated with the digital file. The other user device may receive the response, generate a proof using the salt, and send the proof to the server computer. The proof may indicate to the server computer that the other user device can properly decrypt the session key stored by the server computer.

The server computer may verify the proof received from the other user device and send the session key associated with the digital file to the other user device. After the session key is received, the other user device may decrypt the session key using the link key extracted from the link to generate a decrypted session key. If the decrypted session key is valid, it may be used to enable access to the digital file. For example, the other user device may download the digital file in network storage and decrypt the downloaded digital file using the decrypted session key to generate a decrypted file. If decryption of the digital file is valid, the other user device may access the digital file and collaborate with the user device that generated the link key to securely access and modify digital files.

Although one file is described herein, a file may refer to one or more documents, including an individual documents and multiple documents in a group. For example, a file may be the parent of a group of documents that collectively are referred to as one file. As another example, a collection of documents may be placed in a container in compressed or uncompressed form as one file. In at least some embodiments, files may be separated into metadata and contents. The metadata may include one or more portions of information describing the file or access to the file, including, but not limited to, the title of the file, the type of file, the time of creation for the file, and the last time the file was modified. The contents may include the data stored inside the file, such as text or other data. Secure link sharing and file collaboration may require that files be stored in network storage in an encrypted form and be transmitted to and from the network storage in an encrypted form in which the encryption is unique to each file. For example, each digital file may be encrypted with a unique session key during storage and transport. If a malicious actor gains access to the storage or intercepts the transport, encrypting digital files with unique keys increases data security by requiring further malicious efforts for each file that attempt to decrypt the file.

2. Structural & Functional Overview

In the following description, details are set forth by way of example to facilitate discussion of the disclosed subject matter. It should be apparent to those skilled in the art, however, that the disclosed embodiments are exemplary and not exhaustive of all embodiments consistent with the disclosed subject matter.

FIG. 1 illustrates a distributed computer system showing the context of use and principal functional elements with which one embodiment could be implemented.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

Computer system 100 for secure link sharing and file collaboration may include client 102 communicatively coupled via 103 to network 106, client 104 communicatively coupled via 105 to network 106, and server computer 108 communicatively coupled via 109 to network 106. Network 106 may be implemented as, or may be part of, a local area network (LAN), wireless local area network (WLAN), storage area network (SAN), personal area network (PAN), metropolitan area network (MAN), wide area network (WAN), virtual private network (VPN), intranet, the Internet, or other appropriate network architecture or network system that facilitates the communication of signals, digital information, and/or messages. Network 106 may transmit data using one or more protocols, such as Internet protocol (IP) or another packet-based protocol. Server computer 108 may be communicatively coupled via 116 to storage 110. Storage 110 may be connected to server computer 108 or may be implemented as network storage that is coupled to network 106. Storage 110 may use a storage protocol, such as small computer system interface (SCSI), Internet SCSI (iSCSI), serial attached SCSI (SAS), advanced technology attachment (ATA), serial ATA (SATA), ATA packet interface (ATAPI), serial storage architecture (SSA), integrated drive electronics (IDE), or another storage that operates in accordance with one or more of these protocols.

Clients 102 and 104, which may refer to the users of clients 102 and 104, may be registered to access digital files securely using server computer 108. Each of clients 102 and 104 may be implemented as one or more computing devices. Client 102 may have access to a digital file to which client 104 does not have access and client 102 may seek to share access to the digital file with client 104. The digital file may be stored in network storage, such as storage 110, in an encrypted form and accessible over network 106, such as via server computer 108.

In one embodiment, Client 102 may be programmed to initiate secure password authentication with server computer 108 to gain access to the digital file. In addition, client 104 may be programmed to initiate secure password authentication with server computer 108 and then use a link to the digital file that is transmitted to client 104 by client 102. While certain embodiments herein describe the use of login using secure remote password techniques, other embodiments may use other login methods. Examples include using a hashed password, biometric login techniques, two-factor authentication, and token-based login.

As one example of the password approach, server computer 108 may be programmed to send one or more session keys to network 106, as shown by 118, and network 106 may route the session keys to client 102, as shown by 120. Each session key may correspond to a digital file to which client 102 has access. That is, each session key may be unique to a digital file. The session keys may be encrypted with a public key associated with client 102. After client 102 receives the session keys, client 102 may be programmed to decrypt the session key associated with the digital file using a private key associated with client 102 and the public key. Client 102 may be programmed to store the session key in a decrypted form or an encrypted form to be decrypted when the session key is needed to access or share access to a digital file.

Client 102 may be programmed to generate a link key that is associated with the digital file. The link key may be generated using a random number and be unique to the digital file to be shared with client 104. In at least some embodiments, the value of the link key may be equal to the value of the session key. Using the link key, client 102 may be programmed to encrypt a session key that is associated with the digital file. The session key may be stored in network storage, such as storage 110, in an encrypted form specific to client 102. For example, the session key may be encrypted with a public key associated with client 102. Client 102 may be programmed to receive the session key encrypted with the public key from server computer 108 and decrypt the session key using the private key prior to encrypting the decryption session key with the link key.

Client 102 may be programmed to generate one or more values for secure password authentication. For example, client 102 may be programmed to generate a salt value and a verifier value to be used for secure remote password authentication to allow client 104 to access the digital file. The salt may be a random number to be used for authentication and the verifier may be generated using the link key as a password. For example, the verifier may be based on a private key that is associated with client 102, a constant value, and a large prime number. Client 102 may be programmed to generate the private key associated with client 102 using the salt, a username, and a password, such as the link key.

After the link key is generated, client 102 may be programmed to create a link to the digital file. The link may include a name associated with client 102, such as a username or device identifier, an identifier associated with the digital file, and the link key associated with the digital file. Client 102 may be programmed to transmit the link it created to client 104. For example, client 102 may be programmed to send the link via 122 to network 106 and network 106 may route the information via 124 to client 104. One or more portions of the link to the digital file, such as the link key associated with the digital file, may be end-to-end encrypted between client 104 and client 102. Skilled artisans will appreciate that client 102 may transmit the link to client 104 by sending the link to server computer 108 and requesting server computer 108 to send or forward the link to client 104.

Client 102 may be programmed to send information to server computer 108, as shown by 112. The information received by server computer 108 may include one or more portions of the link that are not end-to-end encrypted between client 104 and client 102, such as the name that is associated with client 102 and the identifier that is associated with the digital file. The information may also include values generated for secure remote password authentication, such as a salt and verifier, and the session key encrypted with the link key to network 106. Network 106 may route the information to server computer 108, as shown by 114. The server computer 108 may be programmed to receive the information and store encrypted session key and values generated for secure remote password authentication, such as the salt and verifier, in correspondence with the name that is associated with client 102 and/or the identifier associated with client 102. Server computer 108 may be programmed to store the information internally, or may use external storage, such as storage 110.

In at least some embodiments, the link key may be placed in an optional portion of the link that may be provided after a hash symbol. Client 102 may be programmed to not transmit the optional portion of the link to the server computer 108. For example, another link may be created for server computer 108 without the optional portion of the link that may include the link key associated with the digital file.

After receiving the link, client 104 may be programmed to extract information from the link, such as the identifier associated with the digital file, the name associated with client 102, and the link key associated with the digital file that was generated by client 102. Client 104 may be programmed to create a request that includes the identifier associated with the digital file and the name associated with client 102. The request may be sent by client 104 to server computer 108. If client 104 has not initiated secure password authentication with server computer 108, client 104 may be programmed to initiate the authentication process, which may use a username, password, and a symmetric key generated using the password. The password and key generated using the password may only reside on client 104 and may not be sent in encrypted or unencrypted form over network 106 to server computer 108. Server computer 108 may be programmed to send one or more messages to client 104 to indicate that client 104, which may also refer to a user for client 104, being authenticated. The messages may contain a token and a private key associated with client 104 sent in encrypted form. Client 104 may decrypt the private key using the key generated using the password.

Server computer 108 may be programmed to receive a request to provide one or more values for secure password authorization, such as a salt to client 104. The request may include the identifier associated with the digital file and the name associated with client 102. Server computer 108 may be programmed to perform one or more validations to determine whether the request is proper. For example, server computer 108 may be programmed to attempt to validate whether client 104 has initiated a login process with the server computer. As another example, server computer 108 may be programmed to attempt to validate the identifier associated with the digital file by matching the identifier to a digital file stored in network storage, such as storage 110. As a further example, server computer 108 may be programmed to attempt to validate the name associated with client 102 to determine whether client 102 has access to the digital file. In some embodiments, one or more validations may be skipped if a prior validation is not successful. For example, if client 104 has not initiated a login process with server computer 108, server computer 108 may be programmed to not attempt to validate the identifier associated with the digital file.

If one or more validations are not successful, server computer 108 may be programmed to create a response that includes an indication of an error associated with one or more of the validations not being successful. If the validations were successful, server computer 108 may be programmed to create a response that includes one or more values for secure password authentication, such as the salt associated with the digital file. The response may be sent by server computer 108 to client 104. For example, server computer 108 may be programmed to send the salt via 126 to network 106 to forward via 128 to client 104.

Client 104 may be programmed to receive the response from server computer 108 and determine whether the response includes one or more values for secure password authentication, such as the salt, or an indication of an error associated with one or more validations not being successful. If the response includes the salt, client 104 may be programmed to generate a proof using the salt and send the proof to server computer 108. For example, client 104 may be programmed to send the proof via 130 to network 106 to forward via 132 to server computer 108. The proof may indicate to server computer 108 that the link key that was extracted from the link at client 104 matches the link key associated with the digital file in network storage without client 104 sending the link key to server computer 108. The proof may be generated in accordance with a secure remote password authentication protocol. For example, the proof may be a proof associated with a session key based on a name of client 102, the link key associated with the digital file that is used as a password, and a value received from the server computer. The name of client 102 may be a username or device identifier for client 102. In addition, the value received by client 104 from the server computer may be based on the verifier sent to server computer 108 by client 102. Server computer 108 may be programmed to send the value without sending the verifier to maintain secure access to the digital file. Server computer 108 may be programmed to verify the proof it receives from client 104 by using, for example, additional values for secure remote password authentication, such as a verifier associated with the digital file that was received from client 102. The verifier may be based on one or more values, including, but not limited to, values generated by client 102 for secure remote password authentication. For example, the verifier may be based on the salt, a username, a password, such as the link key, a constant value, and a large prime number.

If server computer 108 is not able to verify the proof successfully, server computer may be programmed to create a message to send to client 104 with an indication of an error. If server computer 108 does verify the proof, server computer 108 may be programmed to create a message that includes the session key that is associated with the digital file and that was encrypted using the link key associated with the digital file by client 102. Server computer 108 may be programmed to send the message client 104. For example, server computer 108 may be programmed to send the session key via 134 to network 106 to forward via 136 to client 104.

Client 104 may be programmed to receive the message and determine if the session key or an indication of an error is included in the message. If an indication of an error is sent, client 104 may be programmed to raise the error on a display associated with client 104 or may send a message to client 102 indicating there is an error with the link to the digital file. If the session key is sent, client 104 may be programmed to decrypt the session key associated with the file using the link key that client 104 extracted from the link to generate a decrypted session key. Client 104 may be programmed to determine whether decryption of the session key was successful by validating the session key. If the validation is successful, client 104 may be programmed to download the digital file from network storage, such as from storage 110, and decrypt the file using the session key. Client 104 may be programmed to determine whether decryption of the file was successful by validating at least a portion of the file. If at least a portion of the file is validated, client 104 may be programmed to provide access to the decrypted file, such as by displaying the file on a display coupled to client 104 or providing the decrypted file to user of client 104.

Client 104 may be programmed to encrypt the decrypted session key to be used for subsequent access to the digital file. The session key may be encrypted using a public key associated with client 104. After encryption, client 104 may be programmed to send the encrypted session key to server computer 108. For example, client 104 may be programmed to send the encrypted session key via 138 to network 106 to forward via 140 to server computer 108. After receiving the encrypted session key, server computer 108 may be programmed to store the encrypted session key. The key may be stored locally in server computer 108 or may externally in network storage, such as storage 110. The encrypted session key may be stored in correspondence with an identifier associated with the digital file, such as a file identifier, and a name associated with client 104, such as a username or device identifier. If client 104 subsequently initiates secure password authentication with server computer 108 or requests access to the digital file from server computer 108, server computer 108 may be programmed to retrieve the encrypted session key and send the key to client 104. The encrypted session key may be retrieved using the name associated with client 104 and optionally the identifier associated with the digital file. Client 104 may be programmed to receive the encrypted session key and decrypt it using a private key associated with client 104.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of secure file access and secure link sharing. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

Figure 2A:
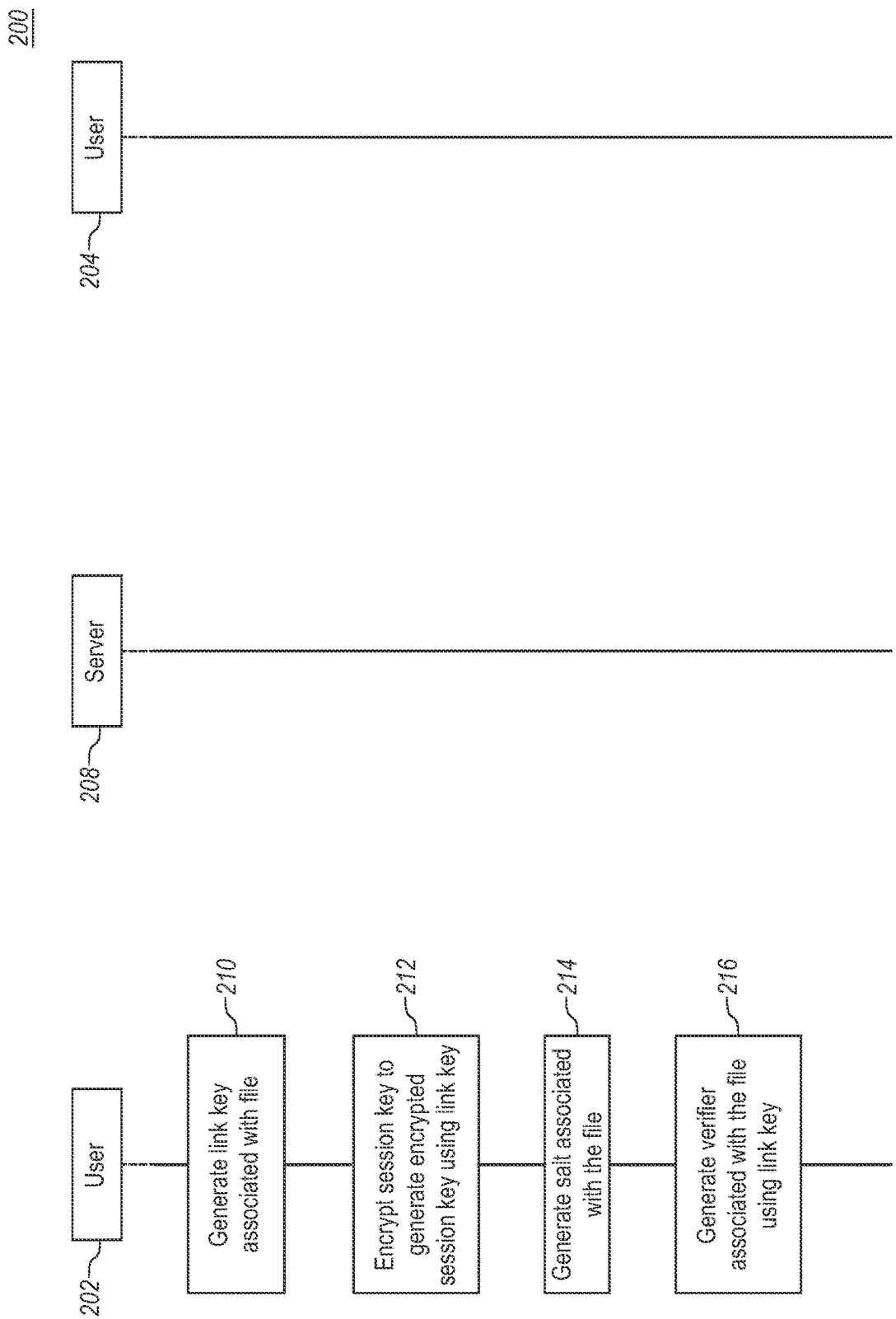
FIG. 2A illustrates an example process showing a message flow diagram for secure link creation and transmittal.

FIG. 2A and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs. Methods consistent with the flow diagrams herein may be initiated by any suitable criteria and may initiate operation at any suitable point. Moreover, such a method may execute its steps in an order that is different than those illustrated in the flow diagrams, terminate at any suitable step, repeat operation at any suitable step, and portions of the method may be performed in parallel and/or repeat with respect to other portions of the method.

FIG. 2A illustrates an example process 200 showing a message flow diagram for secure link creation and transmittal. All operations set forth in FIG. 2A may be implemented using stored program instructions that are executed using the functional elements of FIG. 1, FIG. 4. Thus, for one embodiment, FIG. 2A illustrates a computer-implemented method or algorithm and all elements of FIG. 2A comprise stored program instructions, operations, functions, subroutines, or methods.

In an embodiment, user 202, may be programmed to generate a link key at 210. In this context, "user" may refer to a computing device, client computing device, or computer-implemented account; the term "user" is used as shorthand to refer to a technical element that is associated with an individual but is not to be interpreted as the individual per se. The link key may be generated using a random number and may be associated with the digital file. The digital file may be stored remotely in network storage, such as storage 110 as described for FIG. 1. The digital file may be accessible by user 202 and user 202 may share a secure link of the digital file with user 204, which may refer to another user computing device or client computing device. In at least some embodiments, the value of the link key may be equal to the value of the session key. User 202 may encrypt a session key at 212 using the link key to generate an encrypted session key. The session key may be associated with the digital file. For example, each digital file stored remotely in network storage may be encrypted using a unique session key that is specific to the digital file.

At 214, user 202 may generate a salt associated with the digital file. Although a salt is described for FIG. 2, user 202 may generate other values for secure password authentication. The salt may be a random number to be used for authentication of access to the digital file. At 216, user 202 may generate a verifier associated with the digital file using the link key. The verifier may be based on a private key that is associated with user 202, a constant value, and a large prime number. Although a verifier is described for FIG. 2, user 202 may generate other values for secure password authentication. User 102 may generate the private key using the salt, a username, and a password, such as the link key.

At 218, user 202 may send an identifier, salt, and verifier each associated with the digital file, as well as the encrypted session key to server 208, which may be implemented as server computer 108 as described for FIG. 1. In at least some embodiments, the identifier may be sent by user 202 to server in the first link created at step 222 without one or more portions of the first link that are end-to-end encrypted, such as the link key associated with the digital file. Server 208 may receive the identifier, salt, verifier, and encrypted session key from user 202 and store the salt, verifier, and encrypted session key. For example, server 208 may maintain an internal or external database indexed by the identifier associated with the digital file. At 220, server 208 may store the salt, verifier, and encrypted session key in an entry for the digital file in the database that is specific to user 202, which may be indicated by the identifier sent by user 202 at 218. In at least some embodiments, user 202 may send a name that is associated with user 202 to server 208 and server 208 may store the salt, verifier, and encrypted session key in an entry for the digital file in the database that is specific to the name that is associated with user 202. Before storing the salt, verifier, and encryption session key, server 208 may determine whether the identifier received from user 202 corresponds to a digital file stored in network storage by matching the received identifier to an identifier associated with a digital file stored in network storage. In addition, server 208 may determine whether the name received from user 202 is associated with access to the digital file stored in network storage by matching the receiving name to a name associated with access to the digital file. If the received identifier does not match an identifier associated with a digital file stored in network storage and/or the received name does not match a name associated with access to the digital file, server 208 may respond with an indication of an error to user 202. The error may indicate to user 202 that the identifier associated the digital file is invalid or corrupted and/or the name associated with access to the digital file is invalid or does not have access to the file.

At 222, user 202 may create a first link to the digital file that includes a name associated with user 202, an identifier associated with the digital file, and the link key associated with the digital file. One or more portions of the link, such as the link key that is associated with the digital file, may be end-to-end encrypted between user 202 and user 204. At 224, user 202 may transmit the first link to user 204. The link may be sent directly by user 202 or indirectly by another device, such as server computer 208. Skilled artisans will appreciate that the link may be sent via e-mail, electronic messaging, or another suitable protocol over a network, as is described for network 106 in FIG. 1.

FIG. 2B illustrates an example process 230 showing a message flow diagram for secure file access via a secure link. At 232, user 204 may extract information from the first link transmitted by user 202. The information may include a name associated with user 202, a link key associated with the digital file to be accessed by user 204, and an identifier associated with the digital file. If user 204 has not initiated secure password authentication with server 208, user 204 initiate the authentication before requesting a salt at 234. The request for the salt may use information extracted from the first link, such as the identifier associated with the digital file and name associated with user 202.

Server 208 may receive the request. Server 208 may perform one or more validations to determine whether the request is proper. For example, server 208 may attempt to validate whether user 204 has initiated a login process with the server. As another example, server 208 may attempt to validate the identifier associated with the digital file by matching the identifier to a digital file stored in network storage, such as storage 110 as described for FIG. 1. As a further example, server 208 may attempt to validate the name associated with user 202 to determine whether user 202 has access to the digital file. In some embodiments, one or more validations may be skipped if a prior validation is not successful. For example, if user 204 has not initiated a login process with server 208, server 208 may not attempt to validate the identifier associated with the digital file. If one or more validations are not successful, server 208 may create a response that includes an indication of an error associated with one or more of the validations not being successful. If the validations were successful, server 208 may retrieve the salt, verifier, and encrypted session key associated with the digital file at 236 and create a response that includes the salt associated with the digital file. At 238, the response to the request for the salt may be sent by server 208 to user 204.

User 204 may receive the response and determine whether it includes the salt. In an embodiment, the following sub steps may be programmed. If the salt is not provided, user 204 may determine whether the response includes an indication of an error that may be associated with one or more validations, such as validation that user 204 has initiated a login process with server 208, validation by server 208 of the identifier associated with the file, and validation by server 208 of the name associated with user 202. If the response includes an indication of an error, user 204 may display the error to a display coupled to user 204 or may sent a message to user 202 to convey the indication of the error. If the response includes the salt, user 204 may proceed at 240 to generate a proof based on the salt. The proof may indicate to server 208 that user 204 can properly decrypt and should have access to the session key stored by the server 208 without having user 204 send the link key to server 208. The proof may be generated in accordance with a secure password protocol. For example, the proof may be a proof associated with a session key based on a name of user 202, the link key associated with the digital file, and a value received from server 208. Although a proof is described for FIG. 2, other values generated for secure password authentication may be used to indicate to server 208 that user 204 can properly decrypt the session key. The name of user 202 may be a username or device identifier for user 202. In addition, the value received by user 204 from server 208 may be based on the verifier sent to server 208 by user 202. Server 208 may send the value to be used to generate the proof without sending the verifier to maintain secure access to the digital file. At 242, user 204 may send the proof to server 208.

At 244, server 208 may verify the proof using the verifier it received from user 202. The verifier may be based on the salt, a username, the link key used as a password, a constant value, and a large prime number. If server 208 determines that the proof is incorrect by verification using the verifier, server 208 may send an indication of an error to user 204. If server 208 determines that the proof is correct by verification using the verifier, server 208 may send the session key at 246 to user 204. The session key may be encrypted using the link key that is associated with the digital file.

At 248, user 204 may decrypt the session key using the link key that was extracted from the first link. If the decryption is not successful, user 204 may display an error on a display coupled to user 204 or send a message indicating the error to user 202. If the decryption is successful, user 204 will be able to access the digital file.

FIG. 2C illustrates an example process 250 showing a message flow diagram for secure link recreation and transmittal. User 204 may request server 208 to store a session key encrypted for user 204 for subsequent access. At 252, user 204 may encrypt the session key using a public key associated with user 204 to generate an encrypted session key. At 254, user 204 may send the encrypted session key encrypted using the public key associated with user 204 to server 208. Server 208 may receive the key and, at 256, store the encrypted session key that is encrypted using the public key associated with user 204. The storage of the encrypted session key may correspond to user 204 having access to the digital file. For example, sever 208 may maintain an internal or external database or other organized collection of data storage. An entry for the digital file may be updated to indicate that user 204 has access to the digital file and to store the encrypted session key that is encrypted using the public key associated with user 204.

FIG. 2D illustrates an example process 260 showing a message flow diagram for subsequent secure link creation and transmittal. User 202 may need to recreate and retransmit a link to user 204 to enable user 204 to access and collaborate on a digital file. At 262, user 202 may encrypt the link key using the session key to generate an encrypted link key. The session key may be encrypted with a key associated with user 202 or may be unencrypted. At 264, the encrypted link key may be stored by user 202. Subsequent creation of the secure link may be required in one or more situations. For example, if user 204 does not receive the secure link, user 204 may request user 202 to send the link again. As another example, user 204 may receive an indication of an error and convey the indication to user 202, which may respond by sending the link again. As a further example, user 202 may decide to share a secure link to the digital file with a user other than user 204 and may need to recreate and transmit the link.

At 266, user 202 may retrieve the encrypted link key. At 268, user 202 may decrypt the encrypted link key using the session key associated with the digital file to generate a decrypted link key. At 270, user 202 may create a second link to the digital file. The second link may be based on the name associated with user 202, an identifier associated with the digital file, and the decrypted link key associated with the digital file. At 272, user 202 may transmit the second link to the digital file to user 204. The second link may be based on the name associated with user 202, an identifier associated with the digital file, and the decrypted link key associated with the digital file. User 202 may also send the link to a user other than user 204 to facilitate secure collaboration on the digital file.

Figure 3:
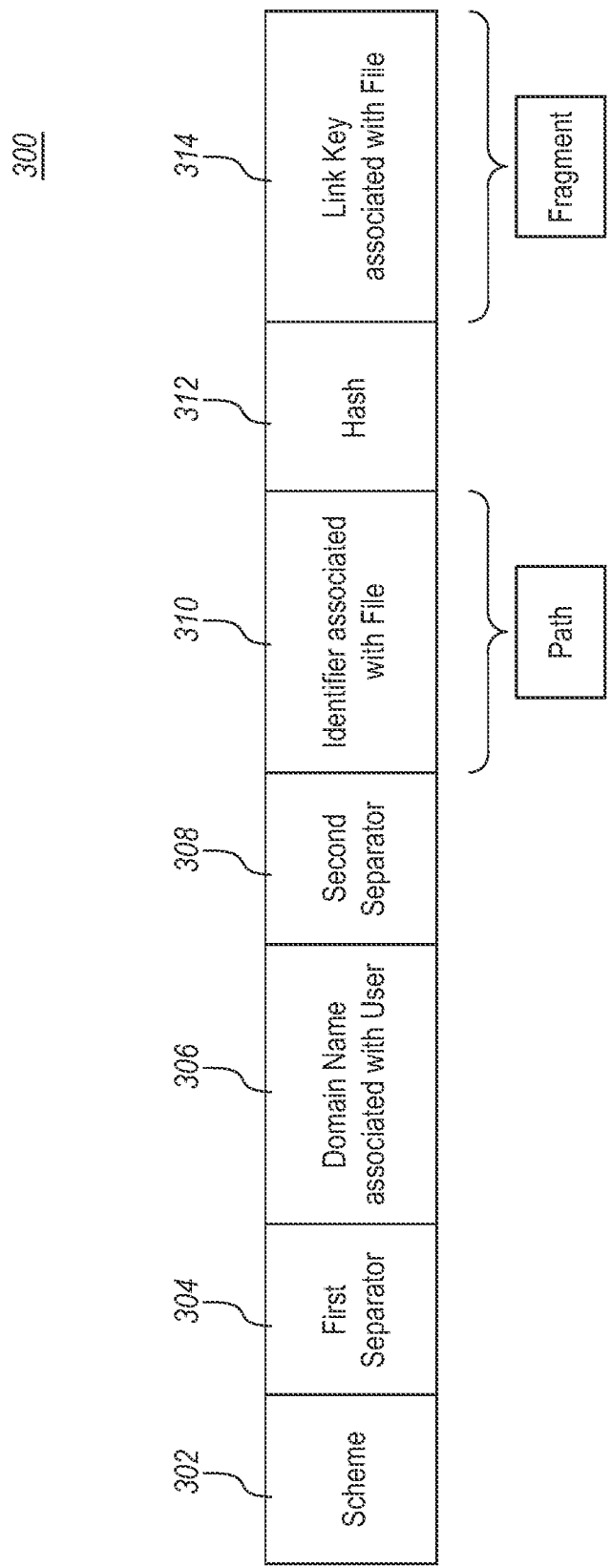
FIG. 3 illustrates an example computer system link with which one embodiment could be implemented.

FIG. 3 illustrates an example computer system link with which one embodiment could be implemented. Link 300 may be created in accordance with one or more protocols, such as hypertext transfer protocol, websocket, hypertext transfer protocol secure, and websocket secure. Link 300 may include an identifier of the scheme 302. The scheme 302 may be registered or non-registered with an authority. For example, scheme 302 may indicate hypertext transfer protocol secure or HTTPS. Those skilled in the art will appreciate that other schemes, such as the file transfer protocol or FTP, may be used for link 300.

Link 300 may include a first separator 304 after scheme 302 and a domain name associated with a user computing device 306. First separator 304 may include a colon and two slashes, such as "://." Domain name 306 may correspond to the name of the computing device that created the link, such as client 102 in FIG. 1 or user device 202 in FIG. 2. After the domain name 306, link 300 may include a second separator 308, such as a slash ("/"), and an identifier 310 associated with the digital file to be securely shared using the link. Identifier 310 may correspond to the path component of link 300. The digital file may be stored in network storage and be accessible to the computing device that created the link. A computing device receiving the link may gain access to the digital file provided the computing device has established secure password authentication with a server computer, such as server computer 108 in FIG. 1 or server computer 208 in FIGS. 2A through 2D. After identifier 310, link 300 may include a hash 312 and a link key 314 that is associated with the digital file to be shared. The portion of link 300 after hash 312 may form a fragment of link 300 that is not transmitted to a server computer or received by the server computer. In at least some embodiments, the fragment of link 300 may correspond to information that is end-to-end encrypted between two computing devices. A computing device may create link 300 and transmit link 300 to another computing device to share secure access to a digital file. The other computing device receiving the link may extract one or more portions of link 300 to obtain a name associated with the computing device that created the link, an identifier associated with the digital file to be shared, and the link key associated with the digital file.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for sharing a network link of a digital file in network storage for end-to-end secure collaboration among multiple computing devices, the method comprising:
   generating a link key associated with the digital file, the file:
      stored remotely in the network storage;
      being accessible by a first computing device;
      to be accessible by a second computing device;
   encrypting a session key associated with the file using the link key associated with the file to generate an encrypted session key, the file being encrypted with the session key;
   generating a salt associated with the file;
   generating a verifier associated with the file using the link key;
   sending a message to a server computer, the message comprising an identifier associated with the file, the salt, the verifier, and the encrypted session key;
   creating a first link to the file, the first link comprising a name associated with the first computing device, the identifier associated with the file, and the link key associated with the file; and
   transmitting the first link to the second computing device.

2. The method of claim 1, further comprising:
   downloading the file to the first computing device from the network storage;
   decrypting the file using the session key associated with the file to generate a decrypted file; and
   determining whether the decryption of the file was successful by validating at least a portion of the decrypted file, wherein the link key is generated based on a determination that the decryption was successful.

3. The method of claim 1, further comprising:
   receiving the session key associated with the file from the server computer;
   determining whether the session key associated with the file is encrypted; and
   decrypting the session key using a private key associated with the first computing device to generate a decrypted session key based on a determination that the session key is encrypted, wherein the session key encrypted using the link key is the decrypted session key.

4. The method of claim 1, further comprising:
   encrypting the link key associated with the file using the session key associated with the file to generate an encrypted link key;
   storing the encrypted link key;
   retrieving the encrypted link key;
   decrypting the encrypted link key using the session key associated with the file to generate a decrypted link key;
   creating a second link to the file, the second link based on the name associated with the first computing device, the identifier associated with the file, and the decrypted link key; and
   transmitting the second link to the second computing device.

5. The method of claim 1, the session key associated with the file being unique to the file.

6. The method of claim 1, wherein a value of the session key associated with the file is equal to a value of the link key associated with the file.

7. The method of claim 1, wherein:
   the link key associated with the file is end-to-end encrypted between the first computing device and the second computing device; and
   the message sent to the server computer comprises one or more portions of the first link that are not end-to-end encrypted between the first computing device and second computing device, the portions comprising a name associated with the first computing device and the identifier associated with the file.

8. A client computing device, comprising:
   a memory;
   a processor coupled to the memory, wherein the memory stores instructions executable by the processor, that, when executed by the processor, cause the processor to:
      generate a link key associated with a digital file for secure collaboration among multiple computing devices, the file:
         stored remotely in network storage;
         being accessible by the client computing device;
         to be accessible by another client computing device;
      encrypt a session key associated with the file using the link key associated with the file to generate an encrypted session key, the file being encrypted with the session key;
      generate a salt associated with the file;
      generate a verifier associated with the file using the link key;
      send a message to a server computer, the message comprising an identifier associated with the file, the salt, the verifier, and the encrypted session key;
      create a first link to the file, the first link comprising a name associated with the client computing device, the identifier associated with the file, and the link key associated with the file; and
      transmit the first link to the other client computing device.

9. The client computing device of claim 8, wherein the memory stores further instructions executable by the processor, that, when executed by the processor, cause the processor to:
   download the file to the client computing device from the network storage;
   decrypt the file using the session key associated with the file to generate a decrypted file; and
   determine whether the decryption of the file was successful by validation of at least a portion of the decrypted file, wherein the link key is generated based on a determination that the decryption was successful.

10. The client computing device of claim 8, wherein the memory stores further instructions executable by the processor, that, when executed by the processor, cause the processor to:
   receive the session key associated with the file from the server computer;
   determine whether the session key associated with the file is encrypted; and
   decrypt the session key using a private key associated with the client computing device to generate a decrypted session key based on a determination that the session key is encrypted, wherein the session key encrypted using the link key is the decrypted session key.

11. The client computing device of claim 8, wherein the memory stores further instructions executable by the processor, that, when executed by the processor, cause the processor to:
   encrypt the link key associated with the file using the session key associated with the file to generate an encrypted link key;
   store the encrypted link key;
   retrieve the encrypted link key;
   decrypt the encrypted link key using the session key associated with the file to generate a decrypted link key;
   create a second link to the file, the second link based on the name associated with the client computing device, the identifier associated with the file, and the decrypted link key; and
   transmit the second link to the other client computing device.

12. The client computing device of claim 8, the session key associated with the file being unique to the file.

13. The client computing device of claim 8, wherein a value of the session key associated with the file is equal to a value of the link key associated with the file.

14. The client computing device of claim 8, wherein:
   the link key associated with the file is end-to-end encrypted between the first computing device and the second computing device; and
   the message sent to the server computer comprises one or more portions of the first link that are not end-to-end encrypted between the first computing device and second computing device, the portions comprising a name associated with the first computing device and the identifier associated with the file.

15. A computer-implemented method for end-to-end secure collaboration among multiple computing devices by sharing a link to a digital file in network storage, the method comprising:
   receiving a link to the digital file from a first computing device, the file being accessible by the first computing device and stored remotely in the network storage and the link received at a second computing device;
   extracting from the link an identifier associated with the file, a name associated with the first computing device, and a link key associated with the file, the link key generated by the first computing device;
   sending a request to a server computer for a salt associated with the file, the request comprising the identifier associated with the file and the name associated with the first computing device;
   receiving a response from the server computer in response to sending the request to the server computer for the salt associated with the file;
   generating a proof using the salt based on a determination that the response from the server computer comprises the salt;
   sending the proof to the server computer, the proof to be verified by the server computer;
   receiving a session key from the server computer in response to sending the proof, the session key associated with the file and encrypted using the link key associated with the file; and
   decrypting the session key associated with the file using the link key associated with the file to generate a decrypted session key, the decrypted session key to be used to enable access to the file by the second computing device.

16. The method of claim 15, further comprising:
   determining whether the response from the server computer comprises the salt associated with the file or an indication of an error associated with at least one of:
      validation by the server computer of the identifier associated with the file;
      validation by the server computer of the name associated with the first computing device; and
      validation by the server computer that the second computing device initiated a login process with the server computer; and
   initiating the login process with the server computer using a secure remote password protocol based on a determination that the response from the server computer comprises the indication of the error associated with at least the validation by the server computer that the second computing device has not initiated the login process with the server computer; and
   resending the request to a server computer for a salt associated with the file, the request comprising the identifier associated with the file and the name associated with the first computing device.

17. The method of claim 15, further comprising:
   determining whether the decryption of the session key using the link key was successful by validating the session key;
   downloading the file to the second computing device from the network storage based on a determination that the decryption of the session key using the link key was successful;
   decrypting the file using the decrypted session key to generate a decrypted file;
   determining whether the decryption of the file was successful by validating at least a portion of the decrypted file; and
   providing access to the decrypted file based on a determination that the decryption of the file was successful.

18. The method of claim 15, further comprising:
   encrypting the decrypted session key using a public key associated with the second computing device to generate an encrypted session key; and
   sending the encrypted session key to the server computer to be stored and retrieved for subsequent access to the file by the second computing device.

19. The method of claim 15, wherein the link to the file is received from the first computing device or the server computer.

20. The method of claim 15, wherein a portion of the link to the file associated with the link key is end-to-end encrypted between the first computing device and the second computing device.

21. The method of claim 15, wherein the proof is further based on:
   a name associated with the first computing device;
   the link key associated with the file; and
   a value received from the server computer, the value based on a verifier.

22. The method of claim 18, wherein the encrypted session key is associated with an indication sent to the server computer corresponding to the second computing device having access to the file.

23. A client computing device, comprising:
   a memory;

a processor coupled to the memory, wherein the memory stores instructions executable by the processor, that, when executed by the processor, cause the processor to:
   receive a link to a digital file for secure collaboration among multiple computing devices, the file:
      stored remotely in network storage;
      being accessible by another client computing device;
      to be accessible by the client computing device;
   extract, from the link, an identifier associated with the file, a name associated with the other client computing device, and a link key generated by the other computing device;
   send a request to a server computer for a salt associated with the file, the request comprising the identifier associated with the file and the name associated with the first computing device;
   receive a response from the server computer in response to the request for the salt;
   generate a proof based on the salt based on a determination that the response from the server computer comprises a salt;
   send the proof to the server computer to be verified by the server computer;
   receive a session key from the server computer in response to sending the proof, the session key associated with the file and encrypted using the link key associated with the file; and
   decrypt the session key associated with the file using the link key associated with the file to generate a decrypted session key, the decrypted session key to be used to enable access to the file by the client computing device.

24. The client computing device of claim 23, wherein the memory stores further instructions executable by the processor, that, when executed by the processor, cause the processor to:
   determine whether the response from the server computer comprises the salt associated with the file or an indication of an error associated with at least one of:
      validation by the server computer of the identifier associated with the file;
      validation by the server computer of the name associated with the other client computing device; and
      validation by the server computer that the client computing device initiated a login process with the server computer; and
   initiate the login process with the server computer using a secure remote password protocol based on a determination that the response from the server computer comprises the indication of the error associated with at least the validation by the server computer that the second computing device has not initiated the login process with the server computer; and
   resend the request to a server computer for a salt associated with the file, the request comprising the identifier associated with the file and the name associated with the first computing device.

25. The client computing device of claim 23, wherein the memory stores further instructions executable by the processor, that, when executed by the processor, cause the processor to:
   determine whether the decryption of the session key using the link key was successful by validating the session key;
   download the file to the client computing device from the network storage based on a determination that the decryption of the session key using the link key was successful;
   decrypt the file using the decrypted session key to generate a decrypted file;
   determine whether the decryption of the file was successful by validating at least a portion of the decrypted file; and
   provide access to the decrypted file based on a determination that the decryption of the file was successful.

26. The client computing device of claim 23, wherein the memory stores further instructions executable by the processor, that, when executed by the processor, cause the processor to:
   encrypt the decrypted session key using a public key associated with the second computing device to generate an encrypted session key; and
   send the encrypted session key to the server computer to be stored and retrieved for subsequent access to the file by the client computing device.

27. The client computing device of claim 23, wherein the link to the file is received from the other client computing device or the server computer.

28. The client computing device of claim 23, wherein a portion of the link to the file associated with the link key is end-to-end encrypted between the client computing device and the other client computing device.

29. The client computing device of claim 23, wherein the proof is further based on:
   a name associated with the other client computing device;
   the link key associated with the file; and
   a value received from the server computer, the value based on a verifier.

30. The client computing device of claim 26, wherein the encrypted session key is associated with an indication sent to the server computer corresponding to the client computing device having access to the file.

* * * * *